United States Patent
Min et al.

(10) Patent No.: US 12,224,427 B2
(45) Date of Patent: Feb. 11, 2025

(54) SECONDARY BATTERY HAVING IMPROVED HIGH-TEMPERATURE PROPERTIES

(71) Applicant: SK Innovation Co., Ltd., Seoul (KR)

(72) Inventors: Jae Yun Min, Daejeon (KR); Jeong A Kim, Daejeon (KR); Sung Jun Park, Daejeon (KR); Da Bin Chung, Daejeon (KR); Jae Kyu Jin, Daejeon (KR); Ji Hwan Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 142 days.

(21) Appl. No.: 16/842,282

(22) Filed: Apr. 7, 2020

(65) Prior Publication Data
US 2020/0395603 A1   Dec. 17, 2020

(30) Foreign Application Priority Data

Jun. 12, 2019   (KR) .................. 10-2019-0069468

(51) Int. Cl.
| | |
|---|---|
| *H01M 4/36* | (2006.01) |
| *H01M 4/505* | (2010.01) |
| *H01M 4/525* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/366* (2013.01); *H01M 4/364* (2013.01); *H01M 4/505* (2013.01); *H01M 4/525* (2013.01); *H01M 4/622* (2013.01); *H01M 4/625* (2013.01); *H01M 4/626* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 8,871,113 B2 | 10/2014 | Kim et al. | |
|---|---|---|---|
| 2020/0006767 A1* | 1/2020 | Du .................. | H01M 4/525 |
| 2020/0091515 A1* | 3/2020 | Takezawa ............ | H01M 4/505 |
| 2020/0127276 A1* | 4/2020 | Kim .................. | H01M 4/525 |

FOREIGN PATENT DOCUMENTS

| CN | 109698317 A | * 4/2019 | ........ H01M 10/0525 |
|---|---|---|---|
| JP | 2003036838 A | 2/2003 | |
| JP | 2017212117 A | 11/2017 | |
| JP | 2019029205 A | 2/2019 | |
| KR | 10-2006-0052499 A | 5/2006 | |
| KR | 10-2013-0116038 A | 10/2013 | |
| KR | 10-2014-0070259 A | 6/2014 | |
| KR | 10-2015-0014828 A | 2/2015 | |
| KR | 20150043769 A | 4/2015 | |
| KR | 10-2019-0012839 A | 2/2019 | |
| WO | WO 2018/221024 A1 | * 6/2018 | ............ H01M 4/131 |
| WO | 2019/022422 A | 1/2019 | |

OTHER PUBLICATIONS

Extended European Search Report issued by the European Patent Office on Oct. 23, 2020.
First Office Action for the Chinese Patent Application No. 202010530740.1 issued by the Chinese Patent Office on May 17, 2023.
Office Action for Korean Patent Application No. 10-2019-0069468 issued by the Korean Patent Office on Jul. 26, 2024.

* cited by examiner

*Primary Examiner* — Jonathan G Leong
*Assistant Examiner* — Tony S Chuo
(74) *Attorney, Agent, or Firm* — IP & T GROUP LLP

(57) ABSTRACT

A secondary battery comprising a positive electrode current collector, a first positive electrode mixture layer disposed on the positive electrode current collector and including a first positive electrode active material and a binder, and a second positive electrode mixture layer disposed on the first positive electrode mixture layer and including a second positive electrode active material and a binder. A nickel content of the second positive electrode active material is 80% by weight or less of a nickel content of the first positive electrode active material. By providing a secondary battery including a positive electrode of a multi-layer structure that includes positive electrode active materials having different contents of nickel, a secondary battery capable of improving high-temperature characteristics while maintaining energy density may be provided.

8 Claims, No Drawings

SECONDARY BATTERY HAVING IMPROVED HIGH-TEMPERATURE PROPERTIES

CROSS-REFERENCE TO RELATED APPLICATION(S)

This application claims the benefit under 35 USC 119(a) of Korean Patent Application No. 10-2019-0069468 filed on Jun. 12, 2019 in the Korean Intellectual Property Office, the entire disclosure of which is incorporated herein by reference for all purposes.

BACKGROUND

The present disclosure relates to a secondary battery having improved high temperature properties, and more particularly, to a lithium secondary battery including a multilayer positive electrode.

As technology development and demand for mobile devices increase, demand for secondary batteries as an energy source is rapidly increasing, and lithium secondary batteries having high energy density and voltage, long cycle life, and low self-discharge rate among such secondary batteries have been commercialized and widely used.

A lithium secondary battery means a battery, in which a non-aqueous electrolyte containing lithium ions is contained in an electrode assembly with a microporous separator between a positive electrode containing a positive electrode active material capable of storing and releasing lithium ions, and a negative electrode containing a negative electrode active material capable of storing and releasing lithium ions.

As a positive electrode active material of such a lithium secondary battery, for example, transition metal oxides such as lithium cobalt oxide ($LiCOO_2$), lithium manganese oxide ($LiMn_2O_4$) or lithium nickel oxide ($LiNiO_2$), complex oxides in which some of these transition metals is replaced with other transition metals, or the like may be used.

Among the positive electrode active materials, $LiCoO_2$ is currently widely used due to excellent general properties such as excellent cycle characteristics or the like, but has relatively low safety, and is expensive due to the resource limitation of cobalt as a raw material, and as a power source in fields such as electric vehicles, there is a limit to use thereof in large quantities.

Lithium manganese oxides such as $LiMnO_2$ or $LiMn_2O_4$ have the advantage of using a resource-rich and environmentally friendly manganese as a raw material, but these lithium manganese oxides have the disadvantages of small capacity and poor cycle characteristics.

Lithium nickel-based oxides such as $LiNiO_2$ are cheaper than the cobalt-based oxides, but exhibit high discharge capacity when charged at 4.3 V. However, the $LiNiO_2$-based positive electrode active material has the advantage of high capacity, but has the disadvantage of low safety and low discharge operating voltage.

Recently, a lithium transition metal oxide ($LiNi_xCo_yMn_zO_2$) in which a portion of nickel is replaced with another transition metal such as manganese or cobalt has been proposed, and a positive electrode active material having a high nickel content has been gradually used. Such metal-substituted nickel-based lithium transition metal oxides have the advantage of being relatively excellent in cycle characteristics and capacity characteristics, but as the nickel content increases, problems such as capacity deterioration due to side reaction with the electrolyte at high temperature, increased resistance, and swelling due to gas generation, and relatively low chemical stability have not been sufficiently solved.

In an attempt to reduce such problems, a positive electrode active material having a controlled nickel content gradient in positive electrode active material particles (which are controlled to have, for example, a high nickel content inside the particle positive electrode active material and a low nickel content on the outside thereof) may be exemplified. However, during a rolling process for the production of an actual electrode, a phenomenon such as fracturing of active material particles occurs, and accordingly, it may be difficult to suppress deterioration of high temperature characteristics. Even in the case of a single electrode in which the positive electrode active material having a low nickel content and the positive electrode active material having a high nickel content are uniformly mixed, the phenomenon of causing side reactions with nickel and electrolytes on the electrode surface may not be suppressed.

SUMMARY

An aspect of the present disclosure is to provide a secondary battery including a multilayer positive electrode, in which a positive electrode active material having a relatively low nickel content is placed on an upper portion of a positive electrode reacting with a relatively large amount of electrolyte, and a positive electrode active material having a relatively high nickel content is disposed on a lower layer portion of a positive electrode reacting with a relatively small amount of electrolyte, thereby improving high-temperature characteristics while maintaining energy density.

According to an aspect of the present disclosure, a secondary battery comprising: a positive electrode current collector; a first positive electrode mixture layer disposed on the positive electrode current collector and including a first positive electrode active material and a binder; and a second positive electrode mixture layer disposed on the first positive electrode mixture layer and including a second positive electrode active material and a binder, wherein a nickel content of the second positive electrode active material is 80% by weight or less of a nickel content of the first positive electrode active material.

The first positive electrode active material may contain 42% by weight or more of nickel.

The second positive electrode active material may contain 37% by weight or less of nickel.

The second positive electrode active material may be contained in an amount of 50% by weight or less of the first positive electrode active material.

A thickness of the first positive electrode mixture layer may be 30 μm to 100 μm.

A thickness of the second positive electrode mixture layer may be 1 μm to 50 μm.

The first positive electrode active material may be at least one selected from $LiNi_{0.7}Co_{0.15}Mn_{0.15}O_2$, $LiNi_{0.8}Co_{0.1}Mn_{0.1}O_2$, $LiNi_{0.9}Co_{0.05}Mn_{0.05}O_2$, and $LiNi_{0.8}Co_{0.15}Al_{0.05}O_2$.

The second positive electrode active material may be at least one selected from $LiNi_{(1/3)}Co_{(1/3)}Mn_{(1/3)}O_2$, $LiNi_{0.4}Co_{0.3}Mn_{0.3}O_2$ $LiNi_{0.5}Co_{0.2}Mn_{0.3}O_2$, $LiNi_{0.5}Co_{0.2}Mn_{0.3}O_2$, $LiNi_{0.6}Co_{0.2}Mn_{0.2}O_2$, and $LiNi_{0.7}Co_{0.15}Mn_{0.15}O_2$.

The binder may be at least one selected from polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber (SBR), hydrogenated nitrile butadiene rubber (H-NBR), fluorine rubber, styrene monomer (SM), Butadiene (BD), butyl acrylate (BA), mussel protein, a polyolefin-based binder, and a silane-based binder.

The first positive electrode mixture layer and the second positive electrode mixture layer may further include a conductive material.

The conductive material may be at least one selected from a carbon nanotube, such as multi-wall CNT, single-wall CNT or the like; graphite such as natural graphite, artificial graphite or the like; carbon black, acetylene black, ketjen black, channel black, furnace black, lampblack, or carbon black of summer black; a conductive fiber such as a carbon fiber, a metal fiber, or the like; a metal powder of carbon fluoride, aluminum and nickel powder, a conductive whisker of zinc oxide and potassium titanate, a conductive metal oxide of titanium oxide, and a polyphenylene derivative.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

The drawings may not be to scale, and the relative size, proportions, and depiction of elements in the drawings may be exaggerated for clarity, illustration, and convenience.

According to an exemplary embodiment, a secondary battery having excellent high temperature characteristics may be provided. According to an exemplary embodiment, a secondary battery comprising: a positive electrode current collector; a first positive electrode mixture layer disposed on the positive electrode current collector and including a first positive electrode active material and a binder; and a second positive electrode mixture layer disposed on the first positive electrode mixture layer and including a second positive electrode active material and a binder, wherein a nickel content of the second positive electrode active material is 80% by weight or less of a nickel content of the first positive electrode active material.

The positive electrode included in the secondary battery according to an exemplary embodiment has a multi-layer structure, and the first positive electrode mixture layer means a positive electrode mixture layer formed on the positive electrode current collector and directly contacting the positive electrode current collector. Accordingly, the second positive electrode mixture layer will be understood as being a positive electrode mixture layer formed on the first positive electrode mixture layer and in contact with the first positive electrode mixture layer.

The electrolyte solution contained in the secondary battery mainly exists in a relatively large amount on an upper layer portion of the electrode, for example, on the surface of the positive electrode or the negative electrode, and the reaction occurs actively. In an exemplary embodiment, the positive electrode of the multilayer structure including the first positive electrode mixture layer and the second positive electrode mixture layer is employed, and in this case, by using the nickel content of the positive electrode active material of the second positive electrode mixture layer less than 80% of the nickel content of the positive electrode active material of the first positive electrode mixture layer, a side reaction with the electrolytic solution generated in the upper layer portion of the electrode may be effectively suppressed.

Accordingly, in the positive electrode of the secondary battery according to an exemplary embodiment, a nickel content of the second positive electrode active material may be 80% by weight or less (excluding 0) of the nickel content of the first positive electrode active material, and in detail, may be 70% by weight or less.

In more detail, the first positive electrode active material may be a material containing 42% by weight or more of nickel with respect to the total weight of the first positive electrode active material, and in further detail, may be a material containing 48% by weight or more. The first positive electrode active material may be, for example, one or more selected from $LiNi_{0.7}Co_{0.15}Mn_{0.15}O_2$, $LiNi_{0.5}Co_{0.1}Mn_{0.1}O_2$, $LiNi_{0.9}Co_{0.05}Mn_{0.05}O_2$, and $LiNi_{0.8}Co_{0.15}Al_{0.05}O_2$, and in more detail, may be $LiNi_{0.8}Co_{0.1}Mn_{0.1}O_2$.

The second positive electrode active material may be a material containing 37% by weight or less of nickel (excluding 0) based on the total weight of the second positive electrode active material, and in detail, may be a material containing 31% by weight or less. The second positive electrode active material may be, for example, one or more selected from $LiNi_{(1/3)}Co_{(1/3)}Mn_{(1/3)}O_2$, $LiNi_{0.4}Co_{0.3}Mn_{0.3}O_2$, $LiNi_{0.5}Co_{0.2}Mn_{0.3}O_2$, $LiNi_{0.6}Co_{0.2}Mn_{0.2}O_2$, and $LiNi_{0.7}Co_{0.5}Mn_{0.5}O_2$, and in more detail, may be $LiNi_{0.8}Co_{0.1}Mn_{0.1}O_2$.

On the other hand, the second positive electrode active material may be included in an amount of 50% by weight or less (excluding 0) of the first positive electrode active material, and in more detail, in an amount of 30% by weight or less. If the content of the second positive electric active material exceeds 50% by weight, the amount of the active material with a relatively small nickel content is excessively large, which may cause a problem that the energy density improving effect of the battery cell according to an exemplary embodiment disappears.

In addition, in an exemplary embodiment, by including the second positive electrode active material in an amount of 50× by weight or less of the first positive electrode active material, a problem in which the positive electrode active material fractures and breaks, resulting in a decrease in the capacity of the positive electrode in a subsequent electrode rolling process, may be significantly reduced.

On the other hand, the thickness of the first positive electrode mixture layer may be 30 μm to 100 μm. If the thickness of the first positive electrode mixture layer is less than 30 μm, there is a problem in that the effect of improving the energy density of the cell is slight, whereas if it exceeds 100 μm, since the resistance of the cell may be increased. Thus, the thickness of the first positive electrode mixture layer may be 30 μm to 100 μm.

In addition, the thickness of the second positive electrode mixture layer may be 1 μm to 50 μm. With a thickness of less than 1 μm, there is a problem that it is difficult to uniformly form the second positive electrode mixture layer on the first positive electrode mixture layer, and if it exceeds 50 μm, the amount of an active material having a relatively small nickel content is excessively large, and thus, there may not be an effect of improving energy density. Therefore, the thickness of the second positive electrode mixture layer may be from 1 μm to 50 μm.

On the other hand, the first positive electrode mixture layer and the second positive electrode mixture layer include a binder, and the binder refers to a component that assists in bonding an active material and a conductive material and bonding to a current collector. The material used as the binder is not particularly limited, and for example, may be polyvinylidene fluoride (PVDF), polyvinyl alcohol, carboxymethyl cellulose (CMC), starch, hydroxypropyl cellulose, recycled cellulose, polyvinylpyrrolidone, tetrafluoroethylene, polyethylene, polypropylene, ethylene-propylene-diene terpolymer (EPDM), sulfonated EPDM, styrene butylene rubber (SBR), hydrogenated nitrile butadiene rubber (H-NBR), fluorine rubber, or styrene monomer (SM), butadiene (BD), butyl acrylate (BA), mussel protein, polyolefin-based binder, or silane-based binder. In detail, one or more selected from PVDF, H-NBR, SBR, mussel protein, polyolefin-based binder, and silane-based binder may b e used. In addition, the types of binders used in respective positive electrode mixture layers may be the same as each other, or may be different from each other.

If necessary, the positive electrode mixture layer may further include a conductive material. The conductive material is a material included to improve the electronic conductivity, and is not particularly limited as long as it has conductivity without causing a chemical change in the battery. For example, carbon nanotubes, such as multi-wall CNT, single-wall CNT, or the like; graphite such as natural graphite, artificial graphite or the like; carbon black of acetylene black, ketjen black, channel black, furnace black, lamp black, or summer black; a conductive fiber such as a carbon fiber, a metal fiber, or the like; a conductive materials, such as a metal powder of carbon fluoride, aluminum and nickel powder, a conductive whisker of zinc oxide and potassium titanate, a conductive metal oxide of titanium oxide, and a polyphenylene derivative, may be used. In addition, the types of conductive materials used in respective positive electrode mixture layers may be the same as each other, or may be different from each other.

The electrolyte applied to the secondary battery according to an exemplary embodiment is not particularly limited, and may be commonly used electrolyte. For example, the electrolyte may be one or more mixed organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma butyrolactone (GBL), fluorethylene carbonate (FEC), methyl formate, ethyl formate, propyl formate, methyl acetate, ethyl acetate, propyl acetate, pentyl acetate, methyl propionate, ethyl propionate, ethyl propionate and butyl propionate.

In addition, the electrolyte according to an exemplary embodiment may further include a lithium salt, and the anion of the lithium salt may be one or more selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Meanwhile, a method of manufacturing a positive electrode having a multilayer structure and a secondary battery according to an exemplary embodiment is not particularly limited, and may be implemented according to a known method. For example, a slurry containing a positive electrode active material, a binder and the like may be applied to an aluminum foil, to then be subjected to rolling, drying and the like, but an exemplary embodiment thereof is not limited thereto.

According to an exemplary embodiment, in a secondary battery including a multilayer positive electrode using a positive electrode active material, in which the nickel content contained in the positive electrode active material of the second positive electrode mixture layer that is the upper layer portion, is 80% by weight or less of the nickel content contained in the positive electrode active material of the first positive electrode mixture layer; since side reaction with the electrolytic solution generated in the upper layer portion of the electrode may be effectively suppressed, capacity deterioration, resistance increase, and swelling due to gas generation may be reduced. In addition, since the second positive electrode active material is contained in an amount of 50% by weight or less (excluding 0) of the first positive electrode active material, a problem in which the positive electrode active material fractures and breaks, resulting in reducing the capacity of the positive electrode, in an electrode rolling process, may be significantly reduced.

EXAMPLES

Hereinafter, embodiments of the present disclosure will be described in more detail with reference to Examples. The following examples are intended to illustrate the present disclosure in more detail, but exemplary embodiments are not limited thereby.

Example 1

(1) Preparation of Positive Electrode

As the first positive electrode active material, 679 g of $LiNi_{0.8}Co_{0.1}Mn_{0.1}O_2$ having a nickel content of 48.3% by weight was used. A first slurry was prepared by using 7 g of carbon nanotubes as a conductive material and 14 g of PVDF as a binder, and the first slurry was applied to an aluminum foil having a thickness of 12 mm. Next, as the second positive electrode active material, 291 g of $LiNi_{0.5}Co_{0.2}Mn_{0.3}O_2$ having a nickel content of 30.4% was used, and 3 g of carbon nanotubes as a conductive material, and 6 g of PVDF as a binder, thereby preparing a second slurry. A positive electrode was prepared by applying the second slurry on the first slurry, drying, and rolling.

(2) Preparation of Negative Electrode and Unit Cell 600 g of graphite was used as the negative electrode active material, and styrene-butylene rubber (SBR) and carboxymethylcellulose (CMC) were used as a binder, to prepare a negative electrode slurry, and then, the negative electrode slurry was coated on a copper foil, dried and rolled, and then the negative electrode was prepared.

Using the positive and negative electrodes prepared as described above, porous polyethylene (PE) was used as the separator, and as electrolyte, LiPF61M and a composition of EC:EMC volume ratio of 3:7 was used, to prepare a unit cell.

Example 2

As the first positive electrode active material, 679 g of $LiNi_{0.9}Co_{0.05}Mn_{0.05}O_2$ having a nickel content of 54.2% by weight was used, and as the second positive electrode active material, 291 g of $LiNi_{(1/3)}Co_{(1/3)}Mn_{(1/3)}O_2$ having a nickel content of 20.3% by weight was used. Excepting the above, a unit cell was manufactured in the same manner as in Example 1.

Comparative Example 1

Except that 679 g of $LiNi0.6Co_{0.2}Mn_{0.2}O_2$ having a nickel content of 36.3% by weight is used as the first positive electrode active material and 291 g of $LiNi_{0.5}Co_{0.2}Mn_{0.3}O_2$ having a nickel content of 20.3% by weight is used as the second positive electrode active material, a unit cell was prepared in the same manner as in Example 1.

Comparative Example 2

A unit cell was prepared in the same manner as in Example 1, except that a positive electrode of a single layer was prepared by mixing the first slurry and the second slurry used in Example 1.

The contents of the active materials contained in the positive electrodes prepared according to Examples 1 and 2 and Comparative Examples 1 and 2, the weight ratio of each layer, etc., the energy density per volume of the unit cell, the storage capacity retention rate of 55° C., the storage gas generation rate of 55° C., and the like are measured, and the relative ratios thereof are illustrated in Table 1 below. In this case, the relative ratio refers to a ratio to a value measured according to Example 1.

TABLE 1

|  | Example 1 | Example 2 | Comparative Example 1 | Comparative Example 2 (single layer) |
| --- | --- | --- | --- | --- |
| Nickel content of first positive electrode active material (% by weight) | 48.3 | 54.2 | 36.3 | 42.93 |
| Nickel content of second positive electrode active material (% by weight) | 30.4 | 20.3 | 30.4 | — |
| Average nickel content of first and second positive electrode mixture layers (%) | 42.9 | 44 | 34.5 | — |
| Nickel weight of second positive electrode active material vs. nickel weight of first positive electrode active material (%) | 62.9 | 37.5 | 83.7 | — |
| Second positive electrode active material weight vs. total positive electrode active material weight (%) | 30 | 30 | 30 | 30 |
| Relative energy density per volume (%) | 100 | 101 | 97 | 100 |
| 55° C. storage, capacity retention ratio relative ratio (12 weeks, %) | 100 | 100 | 102 | 97 |
| 55° C. storage, gas generation amount relative ratio (12 weeks, %) | 100 | 105 | 100 | 120 |

Referring to Table 1, based on the energy density per volume of the unit cell according to Example 1, 55° C. storage capacity retention rate, and 55° C. storage gas generation amount; in Example 2, although the gas generation amount is somewhat high, it can be seen that the energy density per volume is improved, and the capacity retention rate is the same, so it can be confirmed that the level is sufficiently applicable.

On the other hand, it can be confirmed that in Comparative Example 1, the reduction in energy density was too large, and in Comparative Example 2, the capacity retention rate and gas generation characteristics were too inferior, and the high temperature characteristics could not be improved.

As set forth above, according to an embodiment, by providing a secondary battery including a positive electrode of a multi-layer structure that includes positive electrode active materials having different contents of nickel, a secondary battery capable of improving high-temperature characteristics while maintaining energy density may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A secondary battery comprising:
a positive electrode current collector;
a first positive electrode mixture layer disposed on the positive electrode current collector and including a first positive electrode active material and a binder; and
a second positive electrode mixture layer disposed on the first positive electrode mixture layer and including a second positive electrode active material and a binder,
wherein the first positive electrode active material is a lithium transition metal oxide comprising nickel, manganese and cobalt, and contains 42% by weight or more of nickel,
wherein the second positive electrode active material is a lithium transition metal oxide comprising nickel, manganese and cobalt, and contains 37% by weight or less of nickel,
wherein a nickel content of the second positive electrode active material is 62.9% by weight or less of a nickel content of the first positive electrode active material,
wherein the amount of the second positive electrode active material in the second positive electrode mixture layer is 50% by weight or less of the amount of the first positive electrode active material in the first positive electrode mixture layer, and
wherein an average nickel content of the first positive electrode active material in the first positive electrode mixture layer and the second positive electrode active material in the second positive electrode mixture layer is 44% by weight or less.

2. The secondary battery of claim 1, wherein a thickness of the first positive electrode mixture layer is 30 μm to 100 μm.

3. The secondary battery of claim 1, wherein a thickness of the second positive electrode mixture layer is 1 μm to 50 μm.

4. The secondary battery of claim 1, wherein the first positive electrode active material is at least one selected from $LiNi_{0.7}Co_{0.15}Mn_{0.15}O_2$, $LiNi_{0.8}Co_{0.1}Mn_{0.1}O_2$, and $LiNi_{0.9}Co_{0.05}Mn_{0.05}O_2$.

5. The secondary battery of claim 1, wherein the second positive electrode active material is at least one selected from $LiNi_{(1/3)}Co_{(1/3)}Mn_{(1/3)}O_2$, $LiNi_{0.4}Co_{0.3}Mn_{0.3}O_2$, $LiNi_{0.5}Co_{0.2}Mn_{0.3}O_2$, and $LiNi_{0.6}Co_{0.2}Mn_{0.2}O_2$.

6. The secondary battery of claim 1, wherein the binder is at least one selected from polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber (SBR), hydrogenated nitrile butadiene rubber (H-NBR), fluorine rubber, styrene monomer (SM), Butadiene (BD), butyl acrylate (BA), mussel protein, a polyolefin-based binder, and a silane-based binder.

7. The secondary battery of claim 1, wherein the first positive electrode mixture layer and the second positive electrode mixture layer further comprise a conductive material.

8. The secondary battery of claim 7, wherein the conductive material is at least one selected from a multi-wall CNT, a single-wall CNT, natural graphite, artificial graphite, carbon black, acetylene black, ketjen black, channel black, furnace black, lamp black, summer black, a carbon fiber, a metal fiber, a carbon fluoride powder, an aluminum powder, a nickel powder, a zinc oxide, a potassium titanate, a titanium oxide, and a polyphenylene derivative.

* * * * *